United States Patent [19]

Lady

[11] 3,744,368

[45] July 10, 1973

[54] MUSIC TEACHING DEVICE

[76] Inventor: Charles S. Lady, Niagara Christian College, Fort Erie, Ontario, Canada

[22] Filed: Aug. 10, 1972

[21] Appl. No.: 279,747

[52] U.S. Cl. .................................................. 84/470
[51] Int. Cl. ............................................ G09b 15/00
[58] Field of Search .............................. 84/470, 477

[56] References Cited
UNITED STATES PATENTS

| | | | |
|---|---|---|---|
| 1,392,766 | 10/1921 | Huth | 84/470 |
| 1,821,311 | 9/1931 | Lamp | 84/478 |
| 2,547,535 | 4/1951 | Pierce et al. | 84/478 |
| 3,256,765 | 6/1966 | Siegel | 84/470 X |
| 3,695,138 | 10/1972 | Andersen | 84/470 |

*Primary Examiner*—Richard B. Wilkinson
*Assistant Examiner*—Lawrence R. Franklin
*Attorney*—John P. Snyder et al.

[57] ABSTRACT

A music teaching device includes an instructor's keyboard and a number of student boards. The keys of the instructor's keyboard each have three positions, a normal position, a fully depressed position and an intermediate position and each student board includes a pushbutton switch corresponding to each key on the instructor's keyboard. When any instructor's key or keys is depressed a circuit is completed causing a tone or tones corresponding to such key or keys to sound over a speaker and when a depressed key is then released it assumes the intermediate position in which the speaker no longer sounds. The keys which are in an intermediate position may not be released except manually or until another key is depressed. When an instructor's key is either fully depressed or in an intermediate position, circuits are made so that actuation of a corresponding student's pushbutton will cause the corresponding tone to sound in the student's earphone. If a student depressed an incorrect pushbutton, an error lamp or indicator will light to apprise him of this fact and no tone will sound in the earphone. At the same tim, an error signal lamp corresponding to the student's board will light at the instructor's position.

10 Claims, 9 Drawing Figures

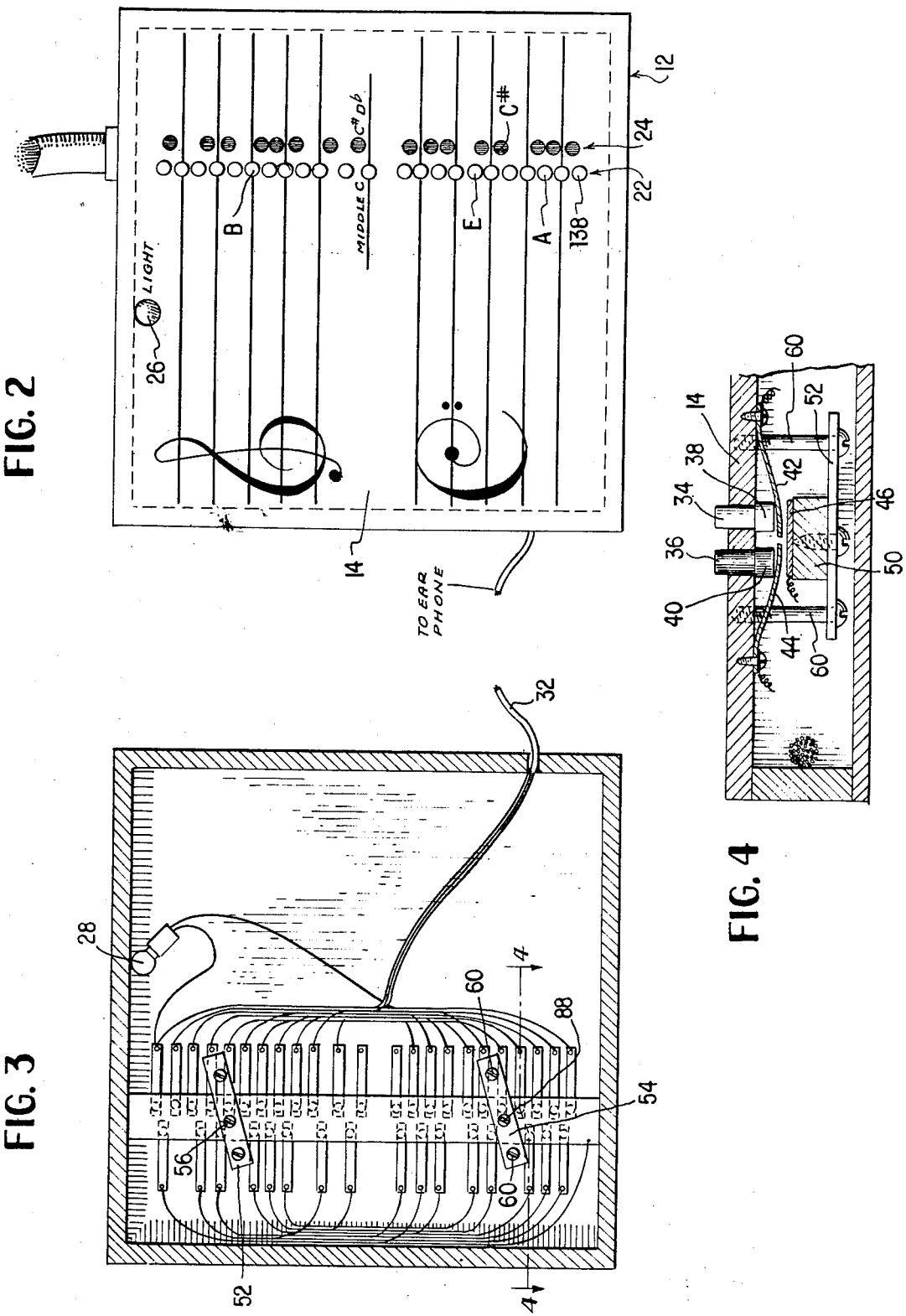

MUSIC TEACHING DEVICE

BACKGROUND OF THE INVENTION

Teaching music may involve an extreme range of skill coverage starting from the rudiments such as familiarization with the piano keyboard and of the various clefs of musical notation to music theory of higher order such as intervals and basic chord structures, inversions, extended chords and the like. Many techniques have been developed for teaching various levels of skills in music but it would be desirable to provide a music training or teaching device which will encompass a wide range of skill levels so that students could be progressively trained over a period of time according to the varying levels of skill sought to be imparted to the student. It is believed that with sufficient time on this instrument, students will begin to hear melodies, intervals and chords when looking at a musical composition.

BRIEF SUMMARY OF THE INVENTION

The present invention is directed to a teaching device which is composed essentially of a piano-like keyboard for the instructor, and individual student boards which are related to the piano keyboard and to the notations on the soprano and bass clefs. A common loudspeaker is provided so that individual notes or combination or groups of notes as selected by the instructor may be sounded for the entire class to hear. Each student board has associated with it an earphone through which the student may hear tones which he selects, provided that he selects the proper note on his keyboard as corresponds with that selected by the instructor. If he selects an incorrect note, he will hear no tone but will cause an error lamp or other indicator to be energized at his student's board to apprise him of the fact that he has committed an error. At the same time a light or other indicator is energized at the instructor's console so that he may identify which student or students have made an error.

The arrangement of the invention is such that a bank of tone generators are provided, one for each of the notes on the instructor's keyboard and the instructor's keyboard arrangement is such as selectively to actuate the switches to sound one or more of the tones selected by the instructor by the depression of the keyboard keys for sounding over a common loudspeaker. The keys when they are released from depressed position in which the common loudspeaker is energized, do not return to their normal positions but remain in an intermediate position in which the common loudspeaker is not energized but the student boards are activated to enable a student to hear over his own earphone, a tone corresponding to one or more of the tones selected by the instructor provided the student selects the proper key on his keyboard. In order to accomplish this, the tone generators are provided with individual amplifiers which ultimately energize the individual student earphones.

BRIEF DESCRIPTION OF THE DRAWING FIGURES

FIG. 2 is a plan view showing the student's boards;

FIG. 3 is a horizontal section taken through the assembly of FIG. 2;

FIG. 4 is an enlarged vertical section taken substantially along the planar section line 4—4 in FIG. 3;

DETAILED DESCRIPTION OF THE INVENTION

Figure 1:
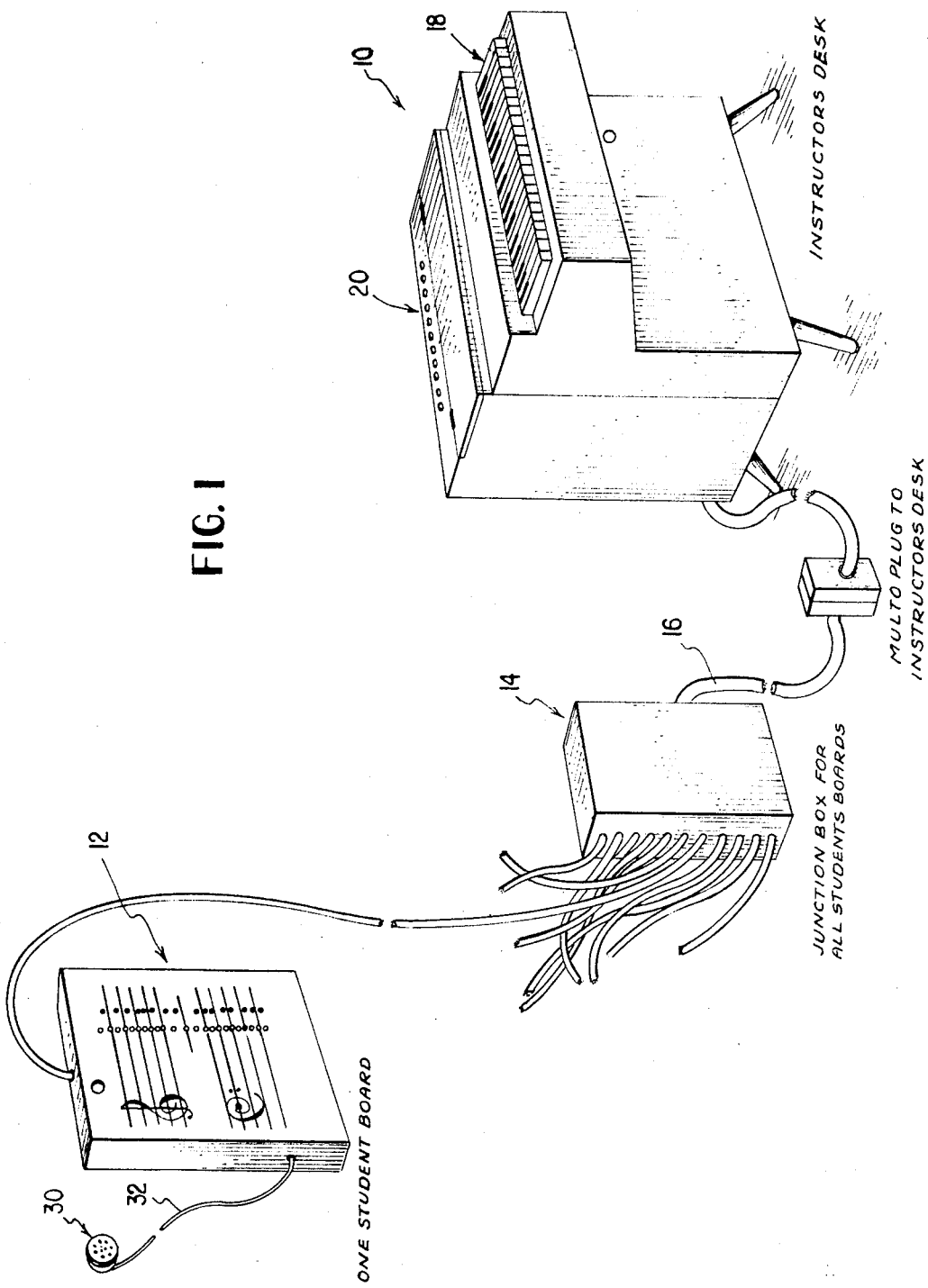
FIG. 1 is a perspective view illustrating certain components on the present system.

With reference to FIG. 1, the instructor's console is indicated therein generally by the reference character 10 and a single student board 12 is shown although it will be understood that as many student boards may be provided as will be necessary. In the arrangement shown, all of the student boards are connected to the junction box 14 and a cable 16 connects the junction box to the console 10 wherein the electronics for the system are located.

The instructor's console 10 includes the keyboard 18 and a panel of indicator lights designated generally by the reference character 20, there being an indicator light for each of the student boards 12 so that, as will hereinafter appear, when a student makes an error, the instructor may immediately identify which student is involved.

As will be more apparent from FIGS. 2–4, each student board 12 includes a face plate 14 on which symbols for the soprano and bass clefs, as shown, are inscribed with the corresponding spaces and lines associated therewith, and these two clefs are vertically associated in a fashion usually employed for piano music notation. Other clefs such as tenor or alto could be placed over the soprano and bass for added clef instruction. The instructor's board in the preferred embodiment of the invention encompasses 39 keys corresponding to notes ranging from F below the bass clef to G above the soprano clef and the student's board is provided with a vertical column of "white key" pushbuttons 22 and, adjacent to this column, a vertical column of "black key" pushbuttons 24 so that the layout correlates the clefs to the piano keyboard and, of course, there are 39 pushbuttons so as to correspond to the 39 keys on the instructor's keyboard.

Thus, directly on the face of the student's board is representation of the basic musical notations and their relationships to the normal piano keyboard, which, in itself, offers familiarization to the student.

The student's board also includes an opening 26 in the face plate 14 behind which a bulb or other light source 28, see FIG. 3, is located and, as will appear hereinafter, when the student makes an error in selection of one of the pushbuttons in the columns 22 or 24, the light will be energized to apprise him of his error. Also associated with the student's board is an earphone 30 as shown in FIG. 1 and the chord 32 associated therewith goes to the interior of the student's board as shown in FIG. 3. The various pushbuttons can be made in any suitable manner but a preferred arrangement is illustrated in FIG. 4. In FIG. 4, a white key pushbutton 34 is illustrated as well as a black key pushbutton 36.

Each has a reduced diameter portion which is slidably received in a suitable opening in the face plate 14 and, beneath the face plate, each is provided with an enlarged head portion 38 or 40 adapted, when a key is depressed, to engage a contact or strip 42 or 44 and press it into electrical contact with the ground strip 46. The ground strip is mounted on a suitable insulated member 50 to which a pair of straps 52 and 54 are affixed as by the fasteners 56 and 58 and these straps are secured to the underside of the face plate 14 by the fasteners 60 as shown.

Figure 5:
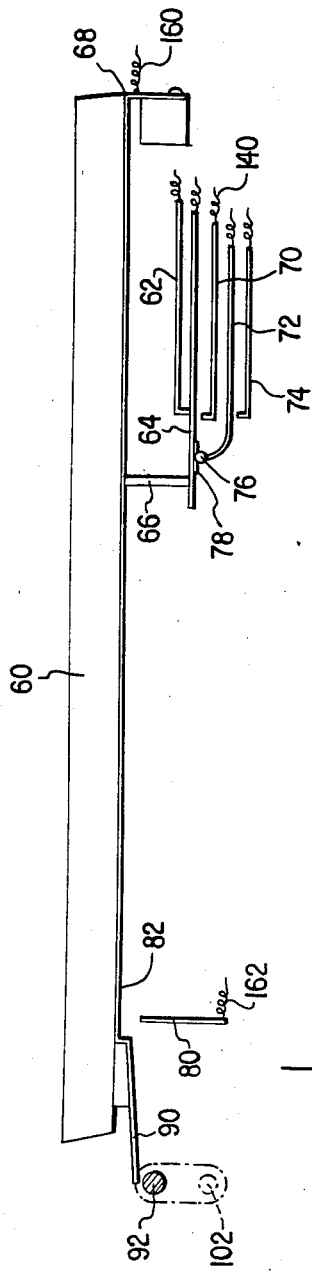
FIG. 5 is a view illustrating one key of the instructor's keyboard in the normal position thereof.
Figure 6:
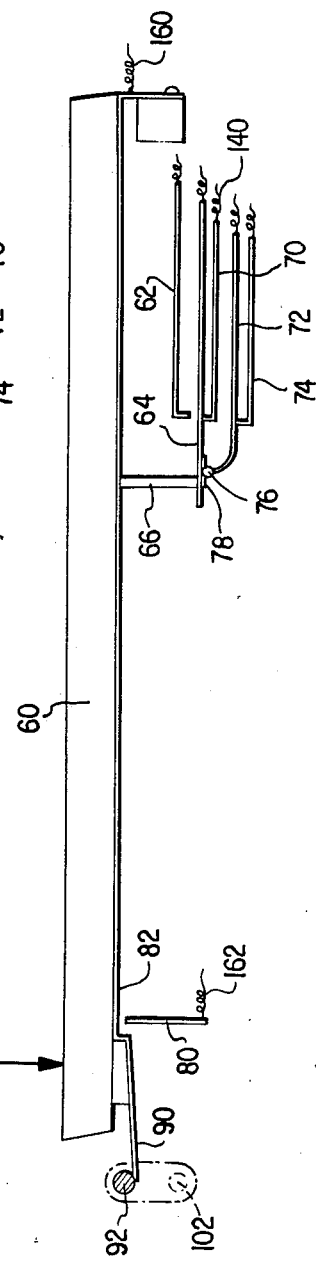
FIG. 6 is a view similar to FIG. 5 but showing the key in intermediate position.
Figure 7:
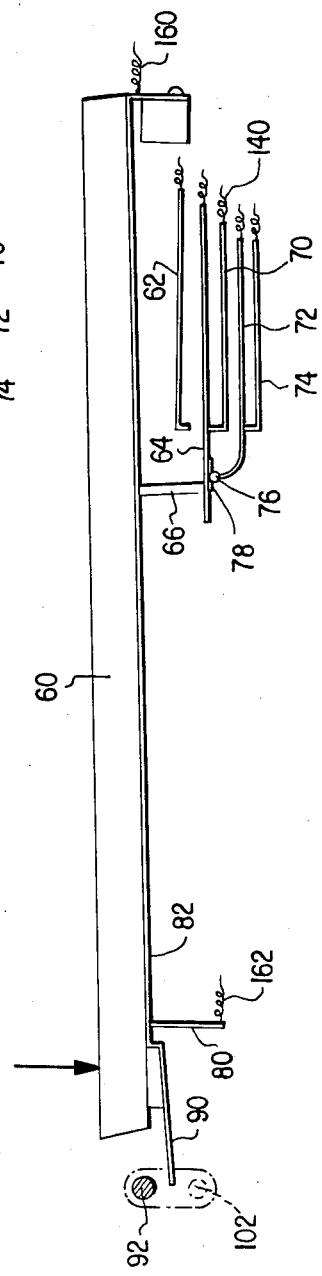
FIG. 7 is a view similar to FIGS. 5 and 6 but showing the key in fully depressed positions.

The instructor's keyboard includes, as previously noted, 39 keys and each of these keys has associated with it a number of contacts as are illustrated in FIGS. 5–7 inclusive. With reference to FIG. 5, wherein the normal position of a key is shown, it will be seen that the key 60 is in an elevated or normal position and that, when in this position, the two contacts 62 and 64 are in electrical engagement. Each key 60 carries an insulating bar 66 which, when the key is depressed so as to hinge about the hinge plate 68, depresses the contact 64 and moves it out of contact with the contact 62 and into electrical connection with the contact 70. At the same time, the contact 72 is depressed and engages electrically with the contact 74. The contact 72 is depressed through the intermediary of the contact 64 by virtue of the upturned end portion thereof which is provided with a head as at 76 engaging with an insulating strip 78 on the underside of the contact 64, substantially as is shown. Thus, no electrical contact is effected as between the contact 64 and 72 in any position of the key.

When the key is fully depressed, its position is as shown in FIG. 7 wherein the contacts 64 and 70 are in electrical engagement and the contacts 72 and 74 are also electrically interconnected. The third position of the key is the intermediate position shown in FIG. 6 wherein the electrical connections between contacts is the same as it is in FIG. 7 with the exception of the additional contacts 80 and 82. Thus, when the key is fully depressed (FIG. 7), the contacts 80 and 82 are in electrical engagement but such is not the case when the key is in the intermediate position shown in FIG. 6. The purpose for this will be presently apparent.

As is shown in FIGS. 5–7 inclusive, the key is provided at its free end and at the underside thereof with a resilient spring finger 90 which, in the normal position of the key, is positioned somewhat above the retaining bar 92. When the key is fully depressed as in FIG. 7, the spring finger has snapped past the retaining bar 92 and is thus beneath it, whereas in the intermediate position shown in FIG. 6, the spring finger 90 has engaged the underside of the retaining bar 92 and holds the key in this intermediate position, the purpose of the entire arrangement being apparent at present.

Figure 9:
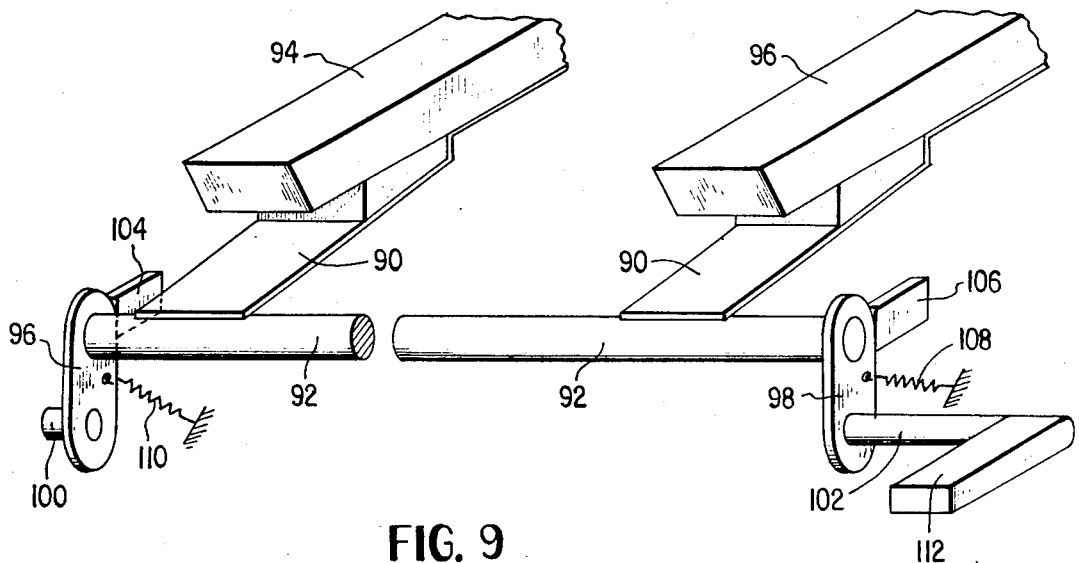
FIG. 9 is a perspective view illustrating the mechanism for holding the instructor's keyboard keys in intermediate position.

To illustrate the retaining bar assembly with greater particularity, reference is had to FIG. 9 wherein a pair of keys 94 and 96 are shown, each having the associated spring fingers 90. The retaining bar 92 extends beneath the entire keyboard array of keys and is carried by a pair of plates 96 and 98 which are provided with pintles or pivot pins 100 and 102 to allow the assembly to rock. Normally, the members 96 and 98 engage against the stops 104 and 106 as urged thereagainst by the tension springs 108 and 110. The pin 102 is extended and is provided at its free end with a laterally projecting lever 112 which may be manually depressed by the instructor, when desired, thereby to release all keys which are held in intermediate position and allow them to return to the normal positions thereof.

Figure 8:
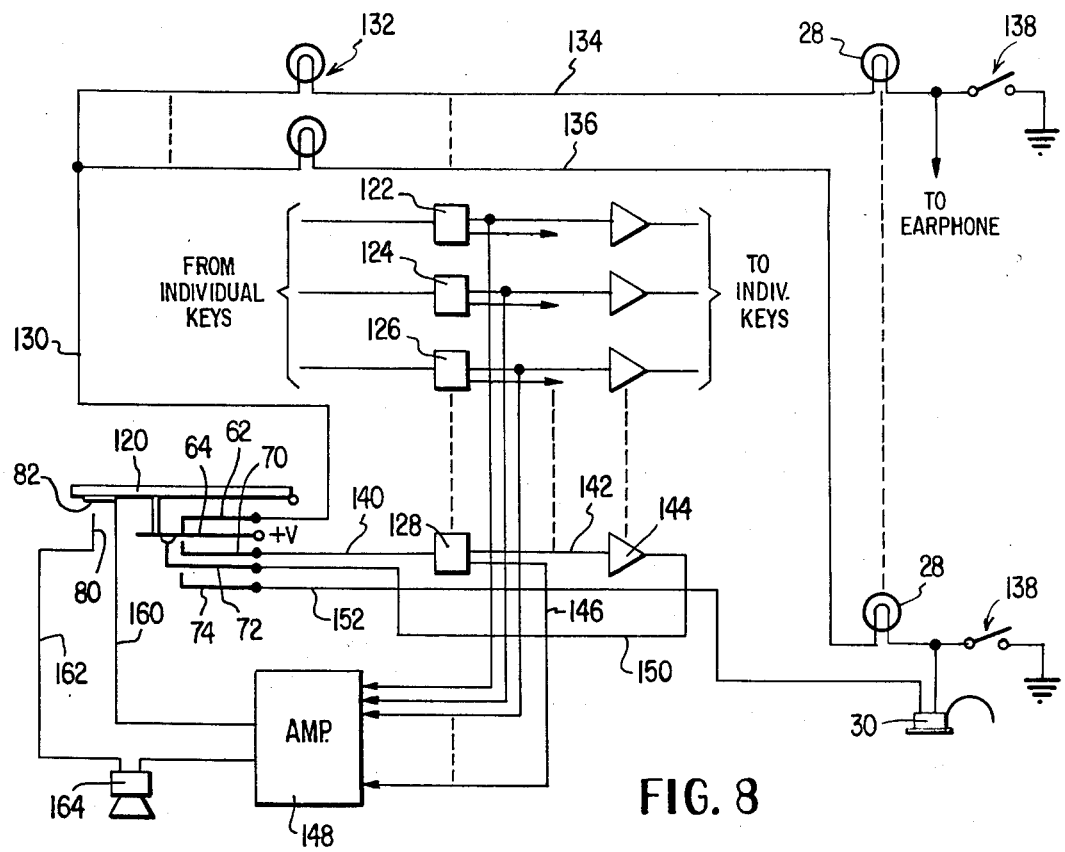
FIG. 8 is a digram illustrating certain of the circuit components of the present invention and their interrelationship.

To appreciate the purpose of the keyboard key assemblies as described in conjunction with FIGS. 5–7, reference is had at this time to FIG. 8. In FIG. 8, for simplicity, only one key 120 of the instructor's keyboard is shown but the Figure does clearly illustrate that there is a tone generator for each of the instructor's keys, such tone generators being indicated for example by reference characters 122, 124, 126 and 128 in FIG. 8. Obviously, the tone generator which corresponds to the key 120 is the tone generator 128 and it will be seen that the contact 64 of any key is connected to a positive voltage source (not shown) so that normally the conductor 130 is energized when the key is up. Each conductor 130 for each of the keys is connected in parallel to a bank of lights or indicators 132, one each for each of the student's boards and corresponding to the indicators 20 of FIG. 1. From each of the indicator lamps 132, there are individual conductors 134 and 136 leading to the indicator lamps 28 of the individual student's boards as shown. Two student board lamps 28 are shown and the conductors from them are indicated by reference characters 134 and 136 and associated with each is a pushbutton switch 138 which, for purposes of this description can be considered as the pushbutton 138 shown in FIG. 2 which is F below the base clef and therefore corresponds to the extreme left-hand key on the instructor's keyboard.

The contact 70 is connected through a conductor 140 to the tone generator 128 associated with the key 120 so that whenever a key is depressed from its normal position, the positive voltage supply will be connected to the associated tone generator thereby generating a tone which is applied over the conductor 142 to an associated amplifier 144. In the arrangement shown in FIG. 8, there is a second output conductor at 146 from each tone generator and all of these secondary outputs are connected to the common amplifier 148. The reason for this dual output from each tone generator will be apparent presently but suffice it to say at the present time that the secondary outputs 146 are a string sound whereas the outputs at 142 are flute sounds. Of course, other sounds may be utilized so long as they are distinguishable.

The output of the amplifier 144 at the conductor 150 is connected to the contact 72 so that when the key is in the position either of FIG. 6 or of FIG. 7, the tone generated by the generator 128 will be applied, through the contact 74 and the conductor 152 to the student's earphone 30 when the pushbutton 138 is depressed. Note that the contact 72 is insulated from the contact 64 at their juncture. Thus, the instructor may depress for example the key corresponding to F below the bass clef to the FIG. 7 position whereupon the string tone then generated at the conductor 146 is applied to the amplifier 148 so that the output of the amplifier across the conductors 160 and 162 is completed through the contacts 80, 82 and loudspeaker 164 so that the entire class can hear this note. Then when the instructor releases the key 120 the loudspeaker sound ceases although now, if the student is asked to push the corresponding pushbutton, the instructor's key will be in the position shown in FIG. 6 so that if the student selects the proper pushbutton 138, he will be rewarded by the corresponding tone through his earphone. Otherwise, if he depresses an incorrect pushbutton, his corresponding signal lamp 132 will be energized at the instructor's console and also his own error lamp 28 will be energized. It will be appreciated that in the position of the key 120 in FIG. 8, depression by the student of his pushbutton 138 will energize his error light 28 and the corresponding lamp 132 at the instructor's console.

From the above, it should be apparent that the system disclosed herein lends itself readily to music instruction at all levels. For example, as has been previously stated, the very fact that the front of each student board carries the bass and treble clefs and has pushbuttons which are positioned in accord with the relation of piano keys to these clefs itself provides familiarization for the student with both the musical clef notations and with the piano keyboard. For a simple exercise, the instructor may depress a key, for example B in the soprano clef, and instruct the class that he has depressed such key which they will hear over the loudspeaker. He may then release the key and ask the students to find the pushbutton corresponding to B in the soprano clef. If, referring to FIG. 2, the student presses the proper pushbutton as designated by reference character B, he will be rewarded by the proper tone in his earphone whereas if he selects any other pushbutton, he will be apprised of the error fact not only by reason of the lack of the tone in his earphone but also the signal lamp 28 will light on his board and, of course, the signal at the instructor's console will also light apprising him that a particular student has chosen a wrong key.

A higher level of teaching will be involved, for example, by the instructor depressing the A, C sharp and E keys in the bass clef and announcing to the class that he is sounding an A major triad. He may then release these keys and ask the students individually to find these notes on their boards or to find the third or the fifth or the root or any combination thereof which they may select and sound individually or collectively, always being rewarded by the proper tone or tones, if correctly selected, in their earphones. Ear training may also be provided such as recognition of intervals and, in fact, anything that can be taught on a piano keyboard can ultimately be taught to the students in a simple and rapid fashion.

What is claimed is;

1. A music teaching device comprising, in combination:
an instructor's keyboard having a plurality of manually depressible keys thereon corresponding to at least a portion of a piano keyboard;
at least one student board having indicia thereon simulating at least one of the musical clefs encompassed by the instructor's keyboard and having manually depressible student selection devices corresponding to all of the notes of the lines and spaces of such musical clef;
tone generator means for each key of the instructor's keyboard;
transducer means for sounding selected tones of said tone generator means;
each key of said instructor's keyboard having switch means associated therewith, each switch means being responsive to fully depressed position of an associated key to connect an associated tone generator means to said transducer means and sound the tone associated with such key through said transducer means and being responsive to an intermediate position to prepare said associated tone generator means for connection to said transducer means;
switch means associated with each manually depressible student selection device to complete the connection from the associated tone generator means to said transducer means through the instructor's keyboard in response to manual depression of such student selection device.

2. A music teaching device as defined in claim 1 wherein said transducer means comprises a loudspeaker for sounding tones selected by the instructor and a student earphone for sounding tones correctly selected by the student.

3. A music teaching device as defined in claim 2 including an error indicating device located at said student board, the switch means associated with the keys of said instructor's keyboard each having a normal position preparing energization of said indicator device, and each switch means of the student board being effective to complete energization of said indicator device when depressed for incorrect selection.

4. A music teaching as defined in claim 1 including an error indicating device located at said student board, the switch means associated with the keys of said instructor's keyboard each having a normal position preparing energization of said indicator device, and each switch means of the student board being effective to complete energization of said indicator device when depressed for incorrect selection.

5. A music teaching device according to claim 3 wherein each said tone generator means has a first distinctive sound output for connection to said loudspeaker and a second distinctive second output for connection to said earphone.

6. A music teaching device according to claim 2 wherein each said tone generator means has a first distinctive sound output for connection to said loudspeaker and a second distinctive sound output for connection to said earphone.

7. A music teaching device comprising, in combination:
an instructor's keyboard having a plurality of manually depressible keys thereon corresponding to at least a portion of a piano keyboard;
at least one student board having indicia thereon simulating at least one of the musical clefs encompassed by the instructor's keyboard and having manually depressible student selection devices corresponding to all of the notes of the lines and spaces of such musical clef;
tone generator means for each key of the instructor's keyboard;
loudspeaker means for sounding tones selected by the instructor; and
earphone means for sounding tones selected by a student which corresponds to tones selected by the instructor;
each key of said instructor's keyboard having first switch means associated therewith;
each manually depressible student selection device having second switch means associated therewith;
each first switch means having a normal position, an intermediate position and a fully depressed position;
first circuit means for connecting said loudspeaker means to an associated tone generator means in response to a fully depressed position of a corresponding first switch means and second circuit means for preparing connection of said earphone means to such associated tone generator means in response to the intermediate position of such corresponding first switch means;

each of said second switch means being in series with a corresponding first switch means for completing said second circuit means when actuated.

8. A music teaching device according to claim 7 including third circuit means including an error indicating device at the student board and completed in response to the normal position of any first switch means and actuation of a corresponding second switch means.

9. A music teaching device according to claim 7 including means for releasably holding any first switch means in its intermediate position when once actuated to its fully depressed position and then released.

10. A music teaching device according to claim 1 including means for releasably holding each switch means associated with the instructor's keys in intermediate position when once actuated to depressed position and then released.

* * * * *